US012194769B2

(12) United States Patent
Kaskiala et al.

(10) Patent No.: US 12,194,769 B2
(45) Date of Patent: Jan. 14, 2025

(54) SECURITY ASSEMBLY AND METHOD FOR MANUFACTURING THE SAME

(71) Applicant: THALES DIS FRANCE SAS, Meudon (FR)

(72) Inventors: Toni Kaskiala, Helsinki (FI); Kristian Lappalainen, Espoo (FI)

(73) Assignee: THALES DIS FRANCE SAS, Meudon (FR)

( * ) Notice: Subject to any disclaimer, the term of this patent is extended or adjusted under 35 U.S.C. 154(b) by 0 days.

(21) Appl. No.: 18/258,233

(22) PCT Filed: Dec. 20, 2021

(86) PCT No.: PCT/EP2021/086742
§ 371 (c)(1),
(2) Date: Jun. 19, 2023

(87) PCT Pub. No.: WO2022/136241
PCT Pub. Date: Jun. 30, 2022

(65) Prior Publication Data

US 2024/0051323 A1 Feb. 15, 2024

(30) Foreign Application Priority Data

Dec. 23, 2020 (EP) .................................... 20306689

(51) Int. Cl.
*B42D 25/324* (2014.01)
*B42D 25/328* (2014.01)
(Continued)

(52) U.S. Cl.
CPC ......... *B42D 25/324* (2014.10); *B42D 25/328* (2014.10); *B42D 25/342* (2014.10); *B42D 25/351* (2014.10); *B42D 25/387* (2014.10)

(58) Field of Classification Search
CPC .. B42D 25/342; B42D 25/324; B42D 25/328; B42D 25/387
(Continued)

(56) References Cited

FOREIGN PATENT DOCUMENTS

EP 2199098 A1 6/2010
EP 2522529 A2 11/2012
(Continued)

OTHER PUBLICATIONS

International Search Report (PCT/ISA/210) and Written Opinion (PCT/ISA/237) mailed on Mar. 11, 2022, by the European Patent Office as the International Searching Authority for current International Application No. PCT/EP2021/086742—[14 pages].

*Primary Examiner* — Justin V Lewis

(57) ABSTRACT

Provided is a security assembly including at least one substrate element, at least one first pattern, and at least one second pattern. The at least one first pattern is associated with the at least one substrate element. The at least one first pattern is at least in part translucent or transparent. The at least one second pattern is associated with the at least one substrate element. Each of the at least one first pattern overlaps at least in part the at least one second pattern. Upon viewing the assembly, the at least one first pattern and the at least one second pattern are configured to generate, at at least one side of the assembly, at least one third pattern, each of the at least one third pattern including an optically variable image. Other embodiments disclosed.

14 Claims, 3 Drawing Sheets

(51) Int. Cl.

| | |
|---|---|
| ***B42D 25/342*** | (2014.01) |
| ***B42D 25/351*** | (2014.01) |
| ***B42D 25/387*** | (2014.01) |

(58) Field of Classification Search

USPC ... 283/67, 72, 87, 91, 94, 98, 109, 110, 111, 283/901

See application file for complete search history.

(56) References Cited

FOREIGN PATENT DOCUMENTS

WO 2018100203 A1 6/2018
WO WO-2020193992 A1 * 10/2020 ............ B41M 3/144

* cited by examiner

SECURITY ASSEMBLY AND METHOD FOR MANUFACTURING THE SAME

FIELD

The invention relates generally to a security assembly notably for a data carrier, like e.g., a security document.

Furthermore, the invention pertains to a method for manufacturing a security assembly.

BACKGROUND

US 2011/0139024 A1 describes a security element. The security element includes an arrangement including a substrate with ink layers. The arrangement allows producing a visible optical effect. Such a visible optical effect allows authenticating and securing a data carrier, like a bank note or a chip card, that incorporates the security element.

However, such a security element needs adding ink layers during one or several further printing operations during the secure element manufacturing which render it more difficult and therefore more expensive to manufacture.

There is a need for an alternative solution that allows authenticating and securing a data carrier with the security assembly while being easier and therefore cheaper to manufacture.

SUMMARY

The invention proposes a solution for satisfying the just herein above specified need by providing a security assembly.

According to the invention, the security assembly includes at least one substrate element, at least one first pattern and at least one second pattern. The at least one first pattern is associated with the at least one substrate element. The at least one first pattern is at least in part translucent or transparent. The at least one second pattern is associated with the at least one substrate element. Each of the at least one first pattern overlaps at least in part the at least one second pattern. Upon viewing the assembly, the at least one first pattern and the at least one second pattern are configured to generate, at at least one side of the assembly, at least one third pattern 26, each of the at least one third pattern including an optically variable image.

The principle of the invention consists in a security assembly with one or several substrate elements, one or several first patterns and one or several second patterns. The first pattern(s) is(are) at least partly translucent or transparent. The first pattern(s) is(are) related to one or several substrate elements. The second pattern(s) is(are) related to one or several substrate elements. Each first pattern overlays at least partly the second pattern(s). The first and the second pattern(s) are adapted to create, at one side or several sides of the security assembly, a third pattern(s) through a visible image, as an optically variable image.

The optically variable image varies, in an optical fashion, by changing an angle of viewing, through the first pattern(s), the second pattern(s).

The assembly is thus arranged to produce such an optically variable image, as a visible optical effect, that appears only when an above-specified assembly arrangement or structure is present.

Contrary to the aforementioned prior art solution, the invention assembly does not need using any additional material(s) than the one(s) typically used for at least some articles and therefore is easier and cheaper to manufacture than the prior art assembly.

The invention assembly allows authenticating, based on an appearance of a visual optical effect, on one or several sides of the assembly, a corresponding assembly.

The invention assembly allows thus improving the security of the concerned assembly.

The invention assembly allows preventing, thanks to the produced visible optical effect, from a tampering and a forgery of the assembly.

The invention assembly is technically simple and efficient to combat its counterfeiting.

The invention assembly allows therefore securing a product or an article, such as a data carrier, like e.g., a passport, an electronic passport or termed e-passport, or an IDentity (or ID) type document, that uses such an invention assembly.

According to a further aspect of the invention, the invention is a method for manufacturing a security assembly.

According to the invention, the method includes:

providing at least one substrate element with at least one first pattern and at least one second pattern, the at least one first pattern being at least in part translucent or transparent;

associating the at least one first pattern with the at least one substrate element;

associating the at least one second pattern with the at least one substrate element, each of the at least one first pattern overlapping at least in part the at least one second pattern; so that, upon viewing the assembly, the at least one first pattern and the at least one second pattern generate, at at least one side of the assembly, at least one third pattern, each of the at least one third pattern including an optically variable image.

BRIEF DESCRIPTION OF THE DRAWINGS

Additional features and advantages of the invention will be apparent from a detailed description of two preferred embodiments of the invention, given as indicative and non-limitative examples, in conjunction with the following drawings.

3, which includes the first pattern, the second pattern and another visual image of the other yield third pattern.

DETAILED DESCRIPTION

Herein under is considered cases in which two invention security assembly embodiments are described. A described first security assembly embodiment is used for protecting a product or an article. A described second security assembly embodiment is well suited for being used for protecting a passport including a data page with a first pattern and a hinge with a second pattern.

However, the invention security assembly may be used in other types of articles, such as, among others, an e-passport, an ID document, a Driving License (or DL) or an ID card.

Naturally, the herein below described embodiments are only for exemplifying purposes and are not considered to reduce the scope of the invention.

The same references that are present in different figures refer to the same features.

Figure 1:
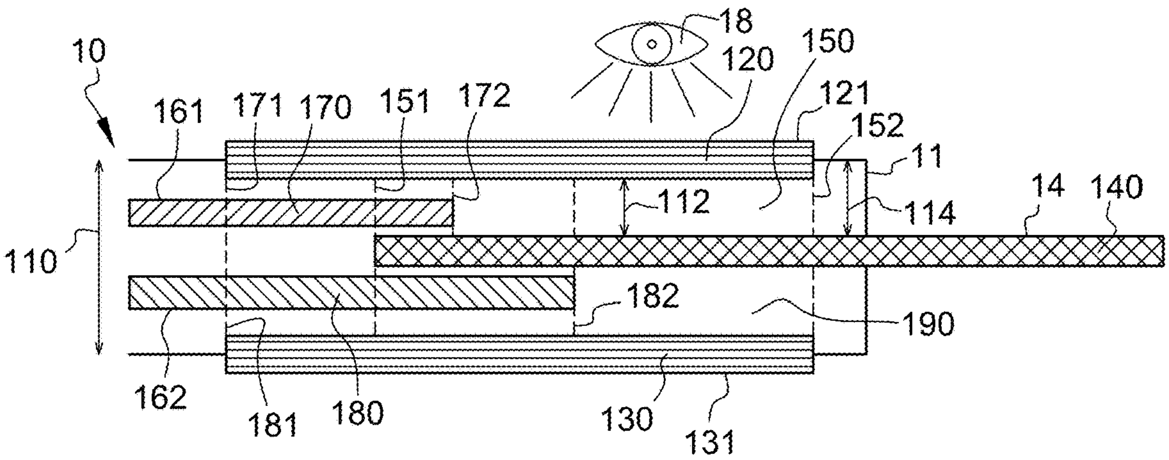
FIG. 1 is a simplified diagram of a cross-sectional view of a security assembly with several substrate elements and first and a second patterns, the patterns being adapted to generate, viewed from the top and/or the bottom of the assembly, a third pattern(s) through an optically variable image, according to an invention embodiment.

FIG. 1 shows schematically a (security) assembly 10.

Such an assembly 10 may be used for protecting an article, such as e.g., a booklet type product, that incorporates (or embeds) or is attached (or bound) to the assembly 10.

The assembly 10 includes several substrate elements with e.g., a main substrate element 11, two first substrate elements 120 (the top one in FIG. 1) and 130 (the bottom one in FIG. 1) and a second substrate element 140.

Alternatively, i.e. instead of including several substrate elements, the assembly includes a single substrate element.

The main substrate element 11 may be made of one or several plastics, such as e.g., a polycarbonate(s).

The two first substrate elements 120 and 130 are incorporated respectively e.g., on the top and the bottom of the main substrate element 11.

A third substrate element 170 may be integrated or incorporated at least in the main substrate element 11 between the first substrate element 120 and the second substrate element 140.

The third substrate element 170 is at least in part opaque.

The first substrate element 120 may overlap at least in part the third substrate element 170.

The third substrate element 170 may overlap at least in part the second substrate element 140.

A fourth pattern 161 is associated with the third substrate element 170. The fourth pattern 161 is at least in part opaque.

A fourth substrate element 180 may be integrated or incorporated at least in the main substrate element 11 between the first substrate element 120 and the second substrate element 140.

The fourth substrate element 180 is at least in part opaque.

The second substrate element 140 may overlap at least in part the fourth substrate element 180.

The fourth substrate element 180 may overlap at least in part the first substrate element 130.

A fourth pattern 162 is associated with the fourth substrate element 180. The fourth pattern 162 is at least in part opaque.

The second substrate element 140 is integrated or incorporated at least in part in e.g., the main substrate element 11.

The two first substrate elements 120 and 130 (or the single substrate element) are provided e.g., each, with a corresponding first pattern 121 or 131 (not represented).

Each of the first substrate elements 120 and 130 is at least in part translucent or transparent in at least one area 150 where the first pattern 121 or 131 overlaps at least in part the second pattern(s) 14.

The first pattern 121 or 131 may include at least in part one or several lenticular elements, like e.g., an array of lenticular structures, (not represented), as a lenticular (or embossing) pattern. The lenticular element(s) or structure(s) is superposed on the surface of the first substrate element 120 or 130.

The lenticular pattern is preferably transparent.

The first pattern 121 or 131 is preferably embedded (or incorporated) in the first substrate element 120 or 130 at a depth that is around the focal depth of the surface lenticular element(s) or structure(s).

The lenticular element(s) or structure(s) allow(s) emphasizing one or several differences between the first pattern 121 or 131 and the second pattern 14.

The first pattern 121 or 131 may include a printed pattern. The printed pattern may be in and/or on the first substrate element 120 or 130. The printed pattern may be at least in part opaque.

The first pattern 121 or 131 and/or the second pattern 14 may include a printed and colored pattern. The printed and colored pattern may be in and/or on the first substrate element 120 or 130 and/or the second substrate element 140.

Each first pattern 121 or 131 may include one or several dots and/or one or several of lines. The line(s) include(s) one or several straight lines and/or one or several curved lines.

Each first pattern 121 or 131 may include at least some locations or areas which are deprived of any material (or the like).

The first patterns 121 and 131 may be at least in part translucent or transparent.

The light passes through the first patterns 121 and 131.

The first patterns 121 and 131 are, each, incorporated (or attached to) at least in part e.g., on (and/or in) its respective first substrate element 120 or 130. The first patterns 121 and 131 are, each, associated with its respective first substrate element 120 or 130 (or the single substrate element).

A second substrate element 140 (or the single substrate element) is provided with one (or several) second pattern(s) 14.

The second substrate element 140 may be (physically) dissociated or separate from each of first substrate elements 120 and 130.

The second pattern(s) 14 is(are) incorporated (or attached to) at least in part e.g., in (and/or on) the second substrate element 140 (or the single substrate element). The second pattern(s) 14 is(are) associated with the second substrate element 140 (or the single substrate element).

The second pattern(s) 14 is(are) at least slightly distinct from the first pattern(s) 121 (and/or 131). Further information is specified infra notably in relation with FIG. 2.

The second pattern(s) 14 may include one or several dots and/or one or several of lines. The line(s) include(s) one or several straight lines and/or one or several curved lines.

The first pattern 121 (or 131) is on a corresponding first plane while the second pattern 14 is on a corresponding second plane. The second plane is preferably separate from the first plane. In other words, the first pattern 121 (or 131) is superposed on the second pattern 140.

Each of the first patterns 121 and 131 is (physically) dissociated or separate from the second pattern 14.

The distance between the first pattern 121 or 131 and the second pattern 14 is positive, i.e. non-null, and less than a maximum distance. The maximum distance represents a thickness of the assembly 10 (including all the substrate elements). The distance between the first pattern 121 or 131 and the second pattern 14 may be e.g., in a range between 50 μm and 1000 μm at least for a passport or an e-passport.

Each of the first patterns 121 and 131 overlaps at least in part the second pattern 14.

The main substrate element 11 that is separate from the first substrate elements 120 and 130 and the second substrate element 140 and which is included between the first substrate elements 120 and 130 and the second substrate element 140 is at least in part translucent or transparent in at least one area 150 where the first pattern(s) 121 (and/or 131) overlap(s) at least in part the second pattern(s) 14. The area 150 is an area represented between dashed lines 172 and 152.

Each of the first pattern 121 and 131 and the second pattern 14 may be defined by one or several materials used for making the associated first substrate element 120 and 130.

The first substrate element 120 or 130 has a first refractive index.

The first substrate element 120 or 130 is made of a first material(s).

The first material(s) is(are) translucent or transparent. For instance, if the first substrate element 120 or 130 is made of polycarbonate, as a first material, the first refractive index is 1,5848.

The second substrate element 140 has a second refractive index.

The second substrate element 140 is made of a second material(s).

The second material(s) is(are) translucent or transparent. For instance, if the second substrate element 140 is made of polyethylene, as a second material, the second refractive index is 1,5192.

The second material is distinct from the first material.

The second refractive index is distinct from the first refractive index.

The difference between the first and second refractive indexes allows refracting differently a light, such as e.g., a daylight or a UV light, that passes through the first substrate element 120 or 130 and the second substrate element 140.

The (or each) second pattern 14 may be defined by one or several second materials, such as e.g., a fabric(s), plastic(s) and/or fibre(s), that are used for making the associated second substrate element 140.

According to an essential invention feature, upon viewing the assembly 10, the first pattern(s) 121 (and/or 131) and the second pattern 14 are adapted (or configured) to generate, at one side or both (or more) sides of the assembly 10, one (or two or more) third pattern(s).

The first pattern(s) 121 (and/or 131) deviate(s) the light that travels through the second pattern 14. Such a light deviation transforms the second pattern 14. Thus, the second pattern 14 that is seen through the first pattern(s) 121 (and/or 131), as a visual pattern combination, allows obtaining a corresponding third pattern(s) (from the front side (or the top) and/or from the reverse side (or the bottom) of the assembly 10).

Two third patterns, namely a first third pattern on the front side of the assembly 10 and a second third pattern on the reverse side of the assembly 10, may be simultaneously present and observable.

The fourth pattern(s) 161 (and/or 162) being at least in part opaque does not allow that the light passes through it (them) at the opaque area(s). The fourth pattern(s) 161 (and/or 162) comprises, each, at least in part in an area between dashed lines 151 and 172 (and/or an area between dashed lines 151 and 182) where the first pattern(s) 121 (and/or 131) overlaps at least in part the second pattern 14.

Each third pattern is visible only where the fourth pattern 161 (and/or 162) is absent, when applicable (i.e. when there is one 161 or 162 or two fourth patterns 161 and 162), in an area 150 between the dashed lines 172 and 152 (and/or in an area 190 between the dashed lines 182 and 152).

Each third pattern includes an optically variable image (not represented in FIG. 1).

Each third pattern includes a pattern of a Moiré interference of the second pattern 14 with the first pattern 121 or 131.

The optically variable image is visible in daylight to at least one naked eye 18 e.g., from the top (and/or the bottom) of the assembly 10.

The optically variable image varies, dynamically, by changing an angle (or an inclination) with which a person observes the second pattern 14 through the first pattern 121 or 131.

The first pattern may include a first colour, such as e.g., green.

The second pattern may include a second colour, such as e.g., red.

The second colour may be or be not distinct from the first colour.

A corresponding generated third pattern includes a third colour, such as brown. The third colour is distinct from the first and the second colour.

Figure 2:
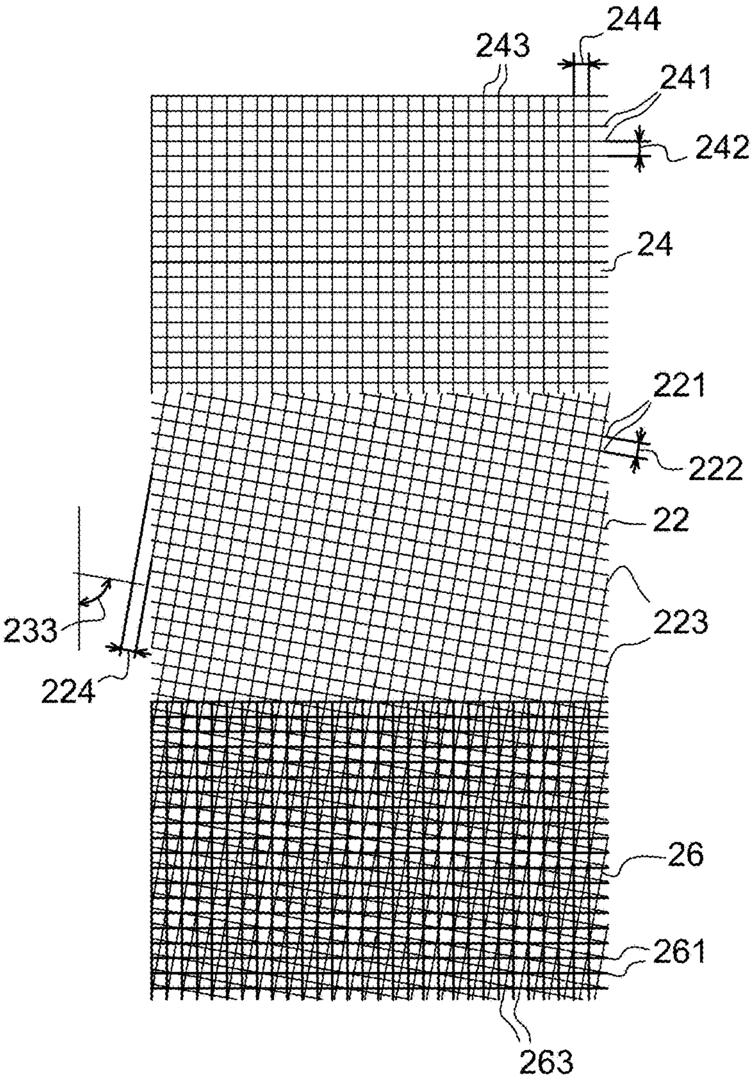
FIG. 2 shows examples of a first and a second pattern that may be used in the assembly of FIG. 1 and which produce, due to a visible optical effect, a third pattern that may be visible from the top of a corresponding assembly.

FIG. 2 depicts two given examples, namely, one for each of the first pattern 22 and the second pattern 24 that may be used, so as to produce a third pattern 26.

The first pattern may include a first grid 22.

The first grid 22 is constituted by e.g., a regular array of straight lines which cross each other.

The array of the straight lines includes e.g., first parallel lines 221 which are inclined with respect to an horizontal line.

The first parallel lines 221 are e.g., equidistant with a first distance or termed pitch 222.

The pitch 222 is a distance separating two consecutive repeating sequences, such as lines, included in a pattern.

The array of the straight lines includes e.g. second parallel lines 223 which are perpendicular to the first parallel lines 221.

The second parallel lines 223 are e.g., equidistant with a second distance or pitch 224. The second pitch 224 may be equal to or distinct from the first pitch 222.

The second pattern may include a second grid 24.

The second grid 24 is constituted by e.g., a regular array of straight lines which cross each other.

The array of the straight lines includes e.g., third parallel lines 241 which may be inclined with respect to an horizontal line.

The second parallel lines 241 are e.g., equidistant with a third distance or pitch 242.

The array of the straight lines includes e.g. fourth parallel lines 243 which are perpendicular to the third parallel lines 241.

The fourth parallel lines 243 are e.g., equidistant with a fourth distance or pitch 244. The fourth pitch 244 may be equal to or distinct from the third pitch 242.

The second pattern 24 is at least in part distinct from the first pattern 22.

The second pattern 24 may be not completely the same than the first pattern 22.

The third pattern 26 includes a Moiré interference pattern. The Moiré interference pattern appears as soon as the second pattern 24 is distinct from the first pattern 22.

The Moiré interference pattern is produced by an interference of the second pattern 24 with the first pattern 22.

The Moiré interference pattern depends on one or several parameters that have different values between the first pattern 22 and the second pattern 24.

The parameter(s) may include a line width, a shape, an angle, a pitch, one or several lens parameters, such as e.g., a height, a width and/or a radius of one or several focus points, and/or (an)other feature(s) that belong(s) to at least one of the first pattern 22 and the second pattern 24.

The first lines 221 in comparison to or with respect to the third lines 241 may have an angle with a value that is typically in a range between 0 degree (0 degree being excluded) and 45 degrees or that is preferably in a range between 0 degree (0 degree being excluded) and 25 degrees.

The first line 221 width or the third line 241 width may have a value that is typically in a range between 10 μm and 500 μm or that is preferably in a range between 50 μm and 400 μm.

The first pitch 222 or the third pitch 242 may have a value that is typically in a range between 10 μm and 500 μm or that is preferably in a range between 50 μm and 400 μm.

The first lines 221 in comparison to or with respect to the third lines 241 may have an angle with a value that is typically in a range between 0 degree (0 degree being excluded) and 45 degrees or that is preferably in a range between 0 degree (0 degree being excluded) and 25 degrees.

The third pattern 26 includes fifth lines 261.

The fifth lines 261 in comparison to or with respect to the first lines 221 may have an angle with a value that is typically in a range between 1 degree and 45 degrees.

Figure 3:
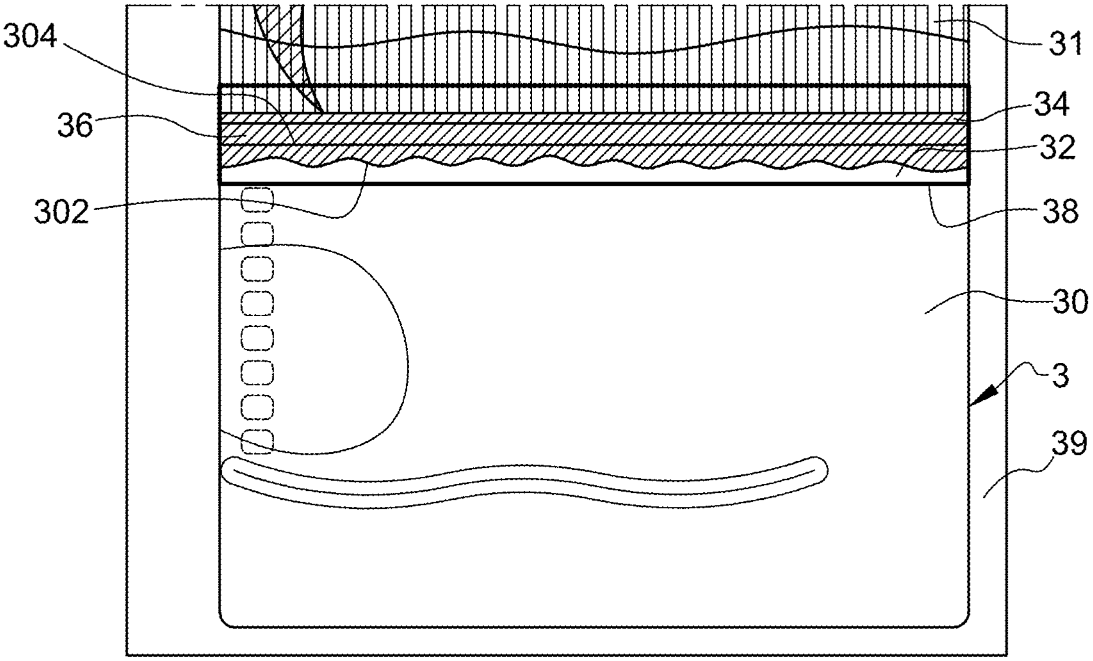
FIG. 3 is a top view of a picture of an interior of an unfolded passport that has been made using a data page with a first pattern and a hinge with a second pattern that allow yielding a third pattern, according to a particular invention embodiment.

FIG. 3 shows a passport 3 that is opened and that is seen in daylight.

The passport 3 is positioned on a support 39.

The passport 3 is attached to (or includes) an invention security assembly.

The passport 3 includes a data page 30, as a multi-substrate element that includes several substrate elements.

The data page 30 includes at least three substrate elements.

The substrate elements include e.g., a first white substrate element that is on the top of a main substrate element. The first white substrate element terminates with a curved line 302.

The main substrate element is e.g., fully transparent.

The substrate elements include e.g., a second white substrate element that is in the main substrate element.

The second white substrate element terminates with a line 304 that is straight in its middle and curved at its ends.

The second white substrate element overlaps more than the first white substrate element the first pattern.

Each of the first and second white substrate element is opaque and therefore prevents the light from passing through.

A first pattern 32 is e.g., on (top) of the data page 30.

The first pattern 32 is on a first plane.

The passport 3 includes a cover 31.

The passport 3 includes a hinge 34, as a second substrate element.

The hinge 34 may include e.g., filaments in different directions, so as to form a grid.

The hinge 34 is partly incorporated (or embedded) in the data page 30.

The hinge 34 is attached to the cover 31 at a folding area of the passport 3.

The hinge 34 allows attaching the data page 30 to the cover 31.

The hinge 34 is made of e.g., a fabric that defines a second pattern 34.

The second pattern 34 is on a second plane that is separate from the first plane.

The first pattern 32 overlaps in part the second pattern 34.

A user observes, in daylight, the assembly with the second pattern 34 through the first pattern 32.

The first pattern 32 and the second pattern 34 are configured to generate, on the front of the data page 30, at least a third pattern 36 including an optically variable image.

The third pattern 36 is located in a rectangle 38 that includes the hinge 34 and a part of the data page 30.

Figure 4:
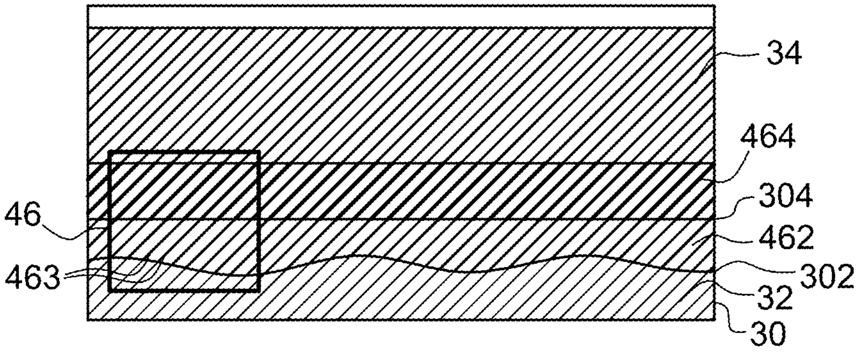
FIG. 4 represents, in a daylight, a zoom in, at the folding area, on the top view of the passport of FIG. 3, which includes the first pattern, the second pattern and the yield third pattern.

The third pattern 36 is further described in relation with FIG. 4.

FIG. 4 shows a rectangle 46 that borders part of the generated third pattern seen from the front side of the data page 30.

The third pattern includes lines 463. The lines 463 clearly appear. The lines 463 are oblique.

The lines 463 appear by transparency as lines 464 on an area where the data and second white substrate element.

The lines 463 appear by transparency as lines 462 on an area where the data in an area between the curved line 302 and the straight portion of the line 304.

A presence of the lines 463 is characteristic of a presence of the Moiré interference of the first pattern 32 with the second pattern 34.

Figure 5:
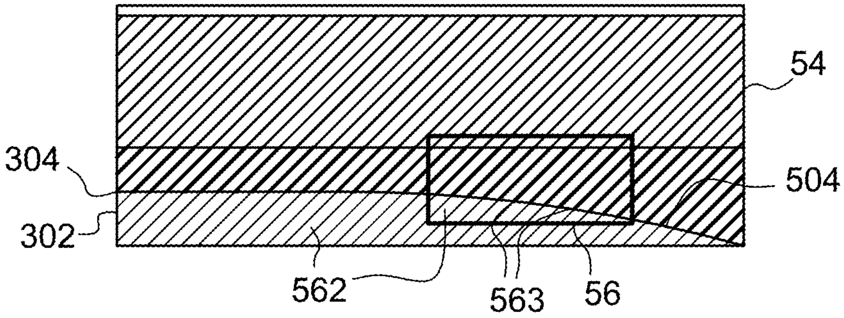
FIG. 5 illustrates, in a daylight, a zoom in, at the folding area, on a bottom view of the passport of FIG. 3, which includes the first pattern, the second pattern and another yield third pattern.

FIG. 5 shows a rectangle 56 that borders part of another generated third pattern seen from the back side of the data page 30.

The data page 30 has an area with a first pattern 52.

The first pattern 52 includes parallel lines which are almost horizontal.

The hinge is associated with another second pattern 54.

The second pattern 54 is defined by the hinge fabric, and/or other material(s) that is included in the hinge.

The first pattern 52 overlaps in part the second pattern 54.

A corresponding generated third pattern includes lines 563. The lines 563 clearly appear. The lines 563 are almost horizontal.

The lines 563 appear by transparency on an area where the data page 30 is fully transparent and where the data page 30 does not include any of the first and second white substrate element.

The lines 563 appear by transparency as lines 562 on an area where the data page 30 is semi-transparent due to the presence of the second white substrate element in an area between the line 304 is curved.

A presence of the lines 563 is characteristic of a presence of the Moiré interference of the first pattern 52 with the second pattern 54.

Figure 6:
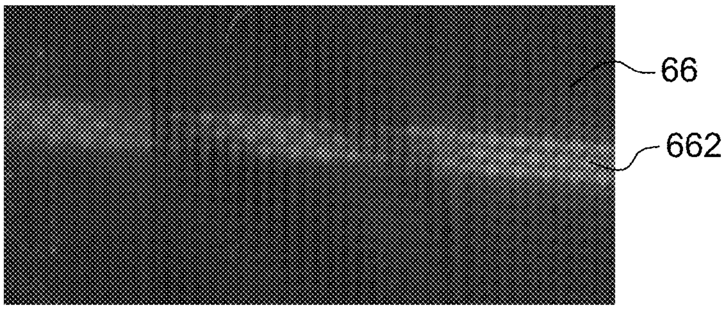
FIG. 6 is, under UltraViolet (or UV) light, a zoom in, at the folding area, on the bottom view of the passport of FIG.

FIG. 6 shows the generated third pattern seen under UV light from the back side of the data page 30.

The hinge, when seen under UV light, is associated with another second pattern 66, as a kind of grid.

The second pattern 66 includes one or several elements that are sensitive to an UV light.

The first pattern overlaps in part the second pattern 66.

A corresponding generated third pattern is visible in the UV light through a semi-transparent or transparent area.

The third pattern includes a line 662. The line 662 clearly appear. The line 662 I slightly oblique.

A presence of the line 662 is characteristic of a presence of the Moiré interference of the first pattern with the second pattern 66.

The invention solution allows thereby improving the security of the resulting assembly.

The invention solution is simple and cheap to manufacture while avoiding to use any extra material(s).

The invention solution is applicable to manufacture notably a DL, an ID document or an e-passport.

The invention claimed is:

1. A security assembly, including at least one substrate element;

at least one first pattern;

at least one second pattern;

wherein the at least one first pattern is associated with the at least one substrate element, the at least one first pattern is at least in part translucent or transparent, the at least one second pattern is associated with the at least one substrate element, wherein each of the at least one first pattern overlapping at least in part the at least one second pattern, wherein, upon viewing the assembly, the at least one first pattern and the at least one second pattern are configured to generate, at at least one side of the assembly; and at least one third pattern, each of the at least one third pattern including an optically variable image, wherein the second pattern is defined by at least one material, and wherein the at least one substrate element includes a hinge.

2. The assembly according to claim 1, wherein the at least one third pattern includes at least one pattern of a Moiré interference of one of the at least one second pattern with one of the at least one first pattern, the second pattern is at least in part distinct from the first pattern with at least one predefined parameter.

3. The assembly according to claim 2, wherein the at least one parameter includes at least one element of a group including:

a line width;

a pitch;

a shape;

an angle; and at least one lens parameter, the at least one lens parameter including at least one element of a group including a height, a width and a radius of at least one focus point.

4. The assembly according to claim 1, wherein the at least one substrate element is at least in part translucent or transparent in at least one area where the at least one first pattern overlaps at least in part the at least one second pattern.

5. The assembly according to claim 1, wherein each one of the at least one first pattern is associated with at least one first substrate element while each one of the at least one second pattern is associated with at least one second substrate element, the at least one second substrate element is separate from the at least one first substrate element.

6. The assembly according to claim 1, wherein the at least one first pattern including a first colour, the at least one second pattern including a second colour, a corresponding generated at least one first third pattern includes a third colour, the third colour is distinct from the first colour and the second colour.

7. The assembly according to claim 1, wherein the at least one first pattern includes at least in part at least one lenticular element or structure, the at least one lenticular element or structure allowing to emphasize at least one difference between the at least one first pattern and the at least one second pattern.

8. The assembly according to any previous claim 1, wherein, the at least one first pattern being separate from the at least one second pattern, the at least one first pattern being associated with at least one first substrate element, the at least one second pattern being associated with at least one second substrate element, the at least one first substrate element having a first refractive index, the at least one second substrate element having a second refractive index, the second refractive index is distinct from the first refractive index.

9. The assembly according to claim 1, wherein the first pattern and/or the second pattern includes at least one printed and/or colored pattern, the at least one printed and/or colored pattern is on or in at least one substrate element.

10. The assembly according to claim 1, wherein the second pattern is separate from the first pattern.

11. The assembly according to claim 1, wherein the second pattern includes at least one element that is sensitive to at least an ultraviolet (UV) light, the at least one third pattern is visible in the UV light through at least one semi-transparent or transparent area.

12. The assembly according to claim 1, wherein the security assembly includes at least one fourth pattern that is at least in part opaque and on or in at least one substrate element, the at least one fourth pattern is comprised at least in part in an area where the first pattern overlaps at least in part the second pattern, the at least one third pattern is visible only where the at least one fourth pattern is absent.

13. A method for manufacturing a security assembly, the method including:

providing at least one substrate element with at least one first pattern and at least one second pattern, the at least one first pattern is at least in part translucent or transparent;

associating the at least one first pattern with the at least one substrate element;

associating the at least one second pattern with the at least one substrate element, each of the at least one first pattern overlapping at least in part the at least one second pattern;

so that, upon viewing the assembly, the at least one first pattern and the at least one second pattern generate, at at least one side of the assembly, at least one third pattern, each of the at least one third pattern including an optically variable image, wherein the second pattern is defined by at least one material, and wherein the at least one substrate element includes a hinge; and wherein, the at least one first pattern being separate from the at least one second pattern, the at least one first pattern being associated with at least one first substrate element, the at least one second pattern being associated with at least one second substrate element, the at least one first substrate element having a first refractive index, the at least one second substrate element having a second refractive index, the second refractive index is distinct from the first refractive index.

14. A security assembly, including at least one substrate element;

at least one first pattern;

at least one second pattern;

wherein the at least one first pattern is associated with the at least one substrate element, the at least one first pattern is at least in part translucent or transparent, the at least one second pattern is associated with the at least one substrate element, wherein each of the at least one first pattern overlapping at least in part the at least one second pattern, wherein, upon viewing the assembly, the at least one first pattern and the at least one second pattern are configured to generate, at at least one side of the assembly; and at least one third pattern, each of the at least one third pattern including an optically variable image, wherein, the at least one first pattern being separate from the at least one second pattern, the at least one first pattern being associated with at least one first substrate element, the at least one second pattern being associated with at least one second substrate element, the at least one first substrate element having a first refractive index, the at least one second substrate element having a second refractive index, the second refractive index is distinct from the first refractive index.

* * * * *